(12) United States Patent
Poulsen

(10) Patent No.: US 8,783,411 B1
(45) Date of Patent: Jul. 22, 2014

(54) APPARATUS AND METHODS FOR UPSHIFTING THE FREQUENCY OF ACOUSTIC ENERGY

(76) Inventor: Peter Davis Poulsen, Grants Pass, OR (US)

(*) Notice: Subject to any disclaimer, the term of this patent is extended or adjusted under 35 U.S.C. 154(b) by 347 days.

(21) Appl. No.: 13/235,350

(22) Filed: Sep. 17, 2011

Related U.S. Application Data

(60) Provisional application No. 61/383,732, filed on Sep. 17, 2010.

(51) Int. Cl.
*G10K 11/172* (2006.01)

(52) U.S. Cl.
USPC ............................... 181/213; 181/251

(58) Field of Classification Search
USPC ......... 181/210, 213, 215, 216, 239, 251, 254, 181/257, 268, 275
See application file for complete search history.

(56) References Cited

U.S. PATENT DOCUMENTS

| | | | | |
|---|---|---|---|---|
| 2,323,394 A * | 7/1943 | Harris | ............................ | 181/247 |
| 3,905,445 A * | 9/1975 | Scharton | ........................ | 181/213 |
| 5,111,509 A * | 5/1992 | Takeuchi et al. | .............. | 381/338 |
| 7,533,760 B1 * | 5/2009 | D'Angelo | ....................... | 181/241 |
| 7,770,694 B2 * | 8/2010 | Baars et al. | .................... | 181/229 |
| 2008/0179132 A1* | 7/2008 | Hunt et al. | ..................... | 181/224 |
| 2009/0308685 A1* | 12/2009 | Gorny et al. | ................... | 181/205 |

* cited by examiner

*Primary Examiner* — Jeremy Luks
(74) *Attorney, Agent, or Firm* — David S. Alavi

(57) ABSTRACT

Method and apparatus for converting acoustic energy in an unshifted acoustic signal into an upshifted acoustic signal, and emitting the upshifted acoustic signal. Using a frequency converter, acoustic energy in a first frequency range in the unshifted acoustic signal is converted into acoustic energy in the upshifted acoustic signal in a second frequency range. The upshifted acoustic signal is emitted into an ambient acoustic environment. The second frequency range is higher than the first; the unshifted acoustic signal comprises an unwanted acoustic noise signal. The effect of the acoustic noise signal can be reduced by: enhanced attenuation of upshifted signal during atmospheric propagation; enhanced attenuation of upshifted signal by a non-gaseous attenuating medium; or decreased coupling of upshifted signal into resonances of a human body or mechanical structure.

13 Claims, 8 Drawing Sheets

| Frequency, Hz | 125 | 250 | 500 | 1000 | 2000 | 3150 | 4000 | 6300 | 8000 |
|---|---|---|---|---|---|---|---|---|---|
| Mean Attenuation, dB | 28.4 | 34.1 | 39.3 | 37.6 | 37.7 | 41.6 | 42.7 | 44.0 | 44.1 |
| Std. Deviation | 5.6 | 5.6 | 5.2 | 3.1 | 3.1 | 3.4 | 3.5 | 3.8 | 5.0 |

FIG. 2A

| Frequency, Hz | 125 | 250 | 500 | 1000 | 2000 | 3150 | 4000 | 6000 | 8000 |
|---|---|---|---|---|---|---|---|---|---|
| Mean Attenuation, dB | 22.1 | 27.9 | 34.9 | 35.8 | 37.3 | 41.4 | 42.3 | 41.6 | 41.2 |
| Std. Deviation | 2.9 | 2.8 | 3.4 | 2.0 | 2.5 | 2.7 | 2.8 | 3.1 | 3.7 |

FIG. 2B

| Freq (Hz) | 125 | 250 | 500 | 1000 | 2000 | 4000 |
|---|---|---|---|---|---|---|
| Material only | 19 | 19 | 27 | 34 | 38 | 43 |
| Mounted | 23 | 26 | 26 | 31 | 50 | 62 |

FIG. 2C

APPARATUS AND METHODS FOR UPSHIFTING THE FREQUENCY OF ACOUSTIC ENERGY

BENEFIT CLAIMS TO RELATED APPLICATIONS

This application claims benefit of prior-filed, U.S. provisional App. No. 61/383,732 filed Sep. 17, 2010 in the name of Peter Davis Poulsen, said provisional application being hereby incorporated by reference as if fully set forth herein.

BACKGROUND

The field of the present invention relates to acoustic noise management or mitigation. In particular, apparatus and methods are described herein for upshifting the frequency of acoustic energy to higher frequencies to reduce various effects of the acoustic energy on its surroundings.

Management or mitigation of acoustic noise is an important issue. Acoustic noise arising from aircraft, ground vehicles, construction or industrial machinery, or other sources can have a variety of deleterious effects on human or animal subjects. Examples of such effects are hearing loss (temporary or permanent), emotional or stress reactions arising from noise exposure, disruption or injury of body organs or components by acoustic body resonances, or degradation of a community environment (e.g., depressed property values near a noise source). Acoustic noise signals can also degrade or damage structural or mechanical components or assemblies (that may or may not be the source of the acoustic noise) by inducing undesirable vibrations or oscillations, particularly if such vibrations are near a natural resonance frequency of the component or assembly. Acoustic noise can also be undesirable in military settings by alerting adversaries to the presence of acoustically noisy military hardware.

As an acoustic signal propagates through the atmosphere, it is attenuated through a variety of mechanisms. That attenuation increases rapidly with increasing acoustic frequency. For example, FIG. 1 shows the atmospheric acoustic absorption coefficient calculated from below 100 Hz up to 1 MHz increasing from about 0.02 dB/100 m at 100 Hz to about 0.6 db/100 m at 1 kHz to about 10 dB/100 m at 10 kHz (at 1 atm, 20° C., and 70% relative humidity). In another example using a calculator available via the Internet, acoustic absorption coefficients of 2.2 dB/km and 105 dB/km were calculated at 400 Hz and 8 kHz, respectively (http://www.csgnetwork.com/atmossndabsorbcalc.html; 1 atm, 20° C., 50% relative humidity). An acoustic signal propagating through 3 km of atmosphere would be attenuated by 6.6 dB at 400 Hz and by 315 dB at 8 kHz.

Similarly, attenuation of acoustic signals by ear-protective gear (e.g., passive earmuffs or foam earplugs) or soundproofing material increases with increasing frequency. FIG. 2A is a table listing acoustic attenuation as a function of acoustic frequency for three commercially available foam earplugs; FIG. 2B is a table listing acoustic attenuation as a function of acoustic frequency for commercially available passive earmuffs; FIG. 2C is a table listing acoustic attenuation as a function of acoustic frequency for commercially available soundproofing material.

Acoustic signals can be directed to propagate as a directional acoustic beam. Diffraction of the acoustic signal causes such a beam to spread as it propagates; that spread can be characterized by a solid angle. The solid angle characterizing a directional acoustic beam is roughly inversely proportional to the product of (i) the area of an aperture, plate, or other structure that emits the acoustic beam and (ii) the square of the frequency of the acoustic signal propagating as the acoustic beam. For a given emitter size, an acoustic signal at a higher frequency can be directed into a tighter acoustic beam. For example, an acoustic signal at 8 kHz can be directed as an acoustic beam that is 400 times narrower (in terms of solid angle) than an acoustic beam carrying an acoustic signal at 400 Hz.

SUMMARY

A method comprises converting acoustic energy in an unshifted acoustic signal into an upshifted acoustic signal, and emitting the upshifted acoustic signal. Using a frequency converter, at least a portion of acoustic energy in the unshifted acoustic signal emitted by an acoustic source in a first frequency range is converted into acoustic energy in the upshifted acoustic signal in a second frequency range. At least a portion of the upshifted acoustic signal is emitted into an ambient acoustic environment. The second frequency range is higher than the first frequency range, and the unshifted acoustic signal comprises one or more unwanted acoustic noise signals. An apparatus comprises a frequency converter arranged to be coupled to the acoustic source and used to perform the method.

The method can be performed to reduce the effect of an unwanted acoustic noise signal. In one example, the intensity of the upshifted portion of the acoustic noise signal decreases with distance due to atmospheric absorption, between a remote reception location and a source of the acoustic noise signal, more rapidly than intensity of the unshifted portion of the acoustic noise signal. In another example, the upshifted portion of the acoustic noise signal is attenuated by a non-gaseous attenuating medium to a greater degree than the unshifted portion of the acoustic noise signal. In still another example, the upshifted portion of the acoustic noise signal couples acoustic energy into one or more resonances of a human body or mechanical structure less efficiently than the unshifted portion of the acoustic noise signal.

Objects and advantages pertaining to acoustic noise management or mitigation may become apparent upon referring to the exemplary embodiments illustrated in the drawings and disclosed in the following written description or appended claims.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is a table listing acoustic attenuation as a function of acoustic frequency for commercially available foam earplugs (Degil Safety Products DePlug 77200 polyurethane foam earplugs; http://www.degilsafety.ca/pdfdocs/ear_cat08.pdf); FIG. 2B is a table listing acoustic attenuation as a function of acoustic frequency for commercially available passive earmuffs (ELVEX HB-650; www.elvex.com/HB-650.htm); FIG. 2C is a table listing acoustic attenuation as a function of acoustic frequency for commercially available soundproofing material (American Micro Industries Quiet Barrier® Specialty Composite; http://www.soundprooffoam.com/pdf/Ultra-Barrier-Plus.pdf).

It should be noted that the embodiments depicted in this disclosure are shown only schematically, and that not all features may be shown in full detail or in proper proportion. Certain features or structures may be exaggerated relative to others for clarity. It should be noted further that the embodiments shown are exemplary only, and should not be construed as limiting the scope of the written description or appended claims.

DETAILED DESCRIPTION OF EMBODIMENTS

It has been observed that certain interactions between an acoustic signal and the environment through which its propagates are strongly frequency dependent; certain behaviors of the acoustic signal also vary with acoustic frequency. The subject of the present disclosure is the use of those observed frequency variations for acoustic noise management or mitigation. By shifting at least a portion of the energy of an acoustic noise signal from a lower frequency to a higher frequency (referred to herein as upshifting), various undesirable effects of the acoustic noise signal can be reduced relative to those effects if the entire signal were unshifted. Instead or in addition, an upshifted portion of the acoustic noise signal can be more tightly directed in an acoustic beam that propagates away from regions where reduction of acoustic noise effects is desired. Upshifting can be beneficial for acoustic noise management or mitigation even if the overall amount of energy of the acoustic noise is not reduced by the upshifting process; such a reduction of acoustic noise energy would, however, be a welcome byproduct of an upshifting process used for acoustic noise management or mitigation. Apparatus or methods exhibiting such concomitant reduction in overall acoustic energy shall fall within the scope of the present disclosure or appended claims.

Certain methods disclosed or claimed herein comprise reducing the effect of an unwanted acoustic noise signal by converting acoustic energy in a first frequency range in an unshifted portion of the acoustic noise signal into acoustic energy in a second frequency range in an upshifted portion of the acoustic noise signal. Using a frequency converter, at least a portion of acoustic energy in the first frequency range (i.e., the unshifted range) is converted into acoustic energy in a second frequency range (i.e., the upshifted range) that is higher than the first frequency range. Upon being emitted into an ambient acoustic environment, the upshifted portion of the acoustic noise signal can have a reduced effect on its surroundings or on people or objects in those surroundings. That reduced effect can come about through a variety of mechanisms, some of which are described below.

Figure 1:
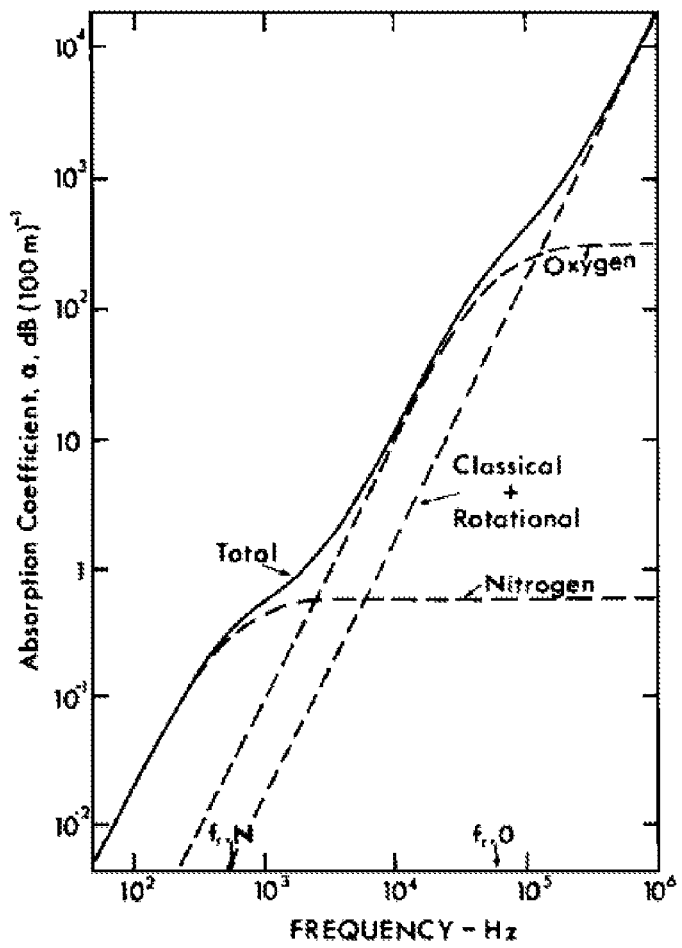
FIG. 1 is a plot of atmospheric acoustic absorption coefficient calculated at 1 atm, 20° C., and 70% relative humidity (J. E. Piercy, T. F. W. Embleton, and L. C. Sutherland, Review of noise propagation in the atmosphere, J. Acous. Soc. Amer., 61:1403-1418, 1977).

In a first example, advantage is taken of the frequency-dependent attenuation of an acoustic signal during atmospheric propagation of that signal (i.e., propagation through a gaseous atmosphere). As has been observed, atmospheric attenuation of an acoustic signal increases substantially with increasing frequency (as in FIG. 1). Reception or sensing of the acoustic noise signal at a reception location remote from the source of the acoustic noise will be decreased with increasing distance from the source by atmospheric attenuation for both unshifted and upshifted portions of the acoustic noise signal, but more so for the upshifted portion of the acoustic noise signal. Intensity of the upshifted portion of the acoustic noise signal decreases with distance, between the remote reception location and a source of the acoustic noise signal, more rapidly than the intensity decreases for the unshifted portion of the acoustic noise signal. By upshifting at least a portion of the acoustic noise signal, overall received intensity of acoustic noise at a remote location can be reduced, without necessarily decreasing the total acoustic noise energy emitted. This effect can be advantageously employed in a wide variety of settings that fall within the scope of the present disclosure or claims. In one example, perceived aircraft noise at locations in a community surrounding an airport or military airfield can be reduced by upshifting a portion of the aircraft noise. In another example, acoustic detection of a military aircraft can be made less likely by upshifting a portion of its engine or exhaust noise.

In a second example, advantage is taken of the frequency-dependent attenuation of an acoustic signal during propagation of that signal through a non-gaseous attenuating medium, e.g., foam earplugs, passive earmuffs, or soundproofing material. As has been observed, attenuation by such media of an acoustic signal increases with increasing frequency (as in FIGS. 2A-2C). Both unshifted and upshifted portions of the acoustic noise signal are attenuated by the medium, but to a greater extent for the upshifted portion of the acoustic noise signal. By upshifting at least a portion of the acoustic noise signal, overall transmitted intensity of acoustic noise through an attenuating medium can be reduced, without necessarily decreasing the total acoustic noise energy incident on that medium.

In a third example, upshifting can be advantageously employed to reduce coupling of acoustic energy into one or more resonances of a human body or mechanical structure. A human body typically exhibits noticeable or perceptible mechanical resonances in a range below about 100 Hz, including chest and abdominal resonances below about 10 Hz (Naval Research Advisory Committee Report on Jet Engine Noise Reduction [2009]). Such resonances are often perceived, e.g., as an uncomfortable sensation in one's chest or abdomen in the presence of intense sound, particularly at low frequencies. Many people have experienced such sensations at a loud rock concert or fireworks display. The long term effects of coupling acoustic energy into body resonances have not been studied; the possibility of long-term physiological or psychological damage cannot be discounted (see, e.g., en.wikipedia.org/wiki/Infrasound). Acoustic noise signals can also degrade or damage structural or mechanical components or assemblies (that may or may not be the source of the acoustic noise) by inducing undesirable vibrations or oscillations, particularly if such vibrations are near a natural resonance frequency of the component or assembly. Many such mechanical resonances occur at relatively low acoustic frequencies (e.g., a few hundred Hz or less; for example, see www.iitr.ac.in/outreach/web/CIRCIS/UG/NVC/ 8%20Vehicle%20Noise%20and%20vibrations%20 Control.pdf). A portion of an acoustic noise signal that is upshifted to frequencies higher than bodily or mechanical resonances couples acoustic energy into those resonances less efficiently than the unshifted portion of the acoustic noise signal. By upshifting at least a portion of the acoustic noise signal, overall acoustic energy coupled into bodily or mechanical resonances can be reduced, without necessarily decreasing the total acoustic noise energy incident on the corresponding body or structure.

Certain methods disclosed or claimed herein comprise converting at least a portion of an acoustic noise signal from an unshifted acoustic frequency to an upshifted acoustic frequency, and emitting the upshifted portion of the acoustic signal. Using a frequency converter, at least a portion of acoustic energy in an unshifted acoustic signal emitted by an acoustic source in a first frequency range (i.e., the unshifted range) is converted into acoustic energy in an upshifted acoustic signal in a second frequency range (i.e., the upshifted range). The unshifted acoustic signal typically comprises one or more unwanted acoustic noise signals. The second, upshifted frequency range is higher than the first, unshifted frequency range. At least a portion of the upshifted acoustic signal is emitted into an ambient acoustic environment.

Those methods can be performed using an apparatus comprising a frequency converter arranged to be coupled to the acoustic source to receive at least a portion of the unshifted acoustic signal emitted by the acoustic source in the first frequency range. The frequency converter is configured to convert at least a portion of acoustic energy in the unshifted acoustic signal into acoustic energy in the upshifted acoustic signal in the second frequency range. The frequency converter is arranged to emit at least a portion of the upshifted acoustic signal into an ambient acoustic environment. The apparatus can further comprise the acoustic source, with the frequency converter coupled to the acoustic source to receive at least a portion of the unshifted acoustic noise signal.

A few example acoustic frequencies or frequency ranges are explicitly disclosed herein. However, the advantages of acoustic upshifting can be exploited for acoustic noise in virtually any acoustic frequency range by upshifting it to a still higher frequency range. Upshifting of acoustic signals at any acoustic frequency that results in one or more of the effects or benefits disclosed herein shall fall within the scope of the present disclosure or appended claims.

Figure 3:
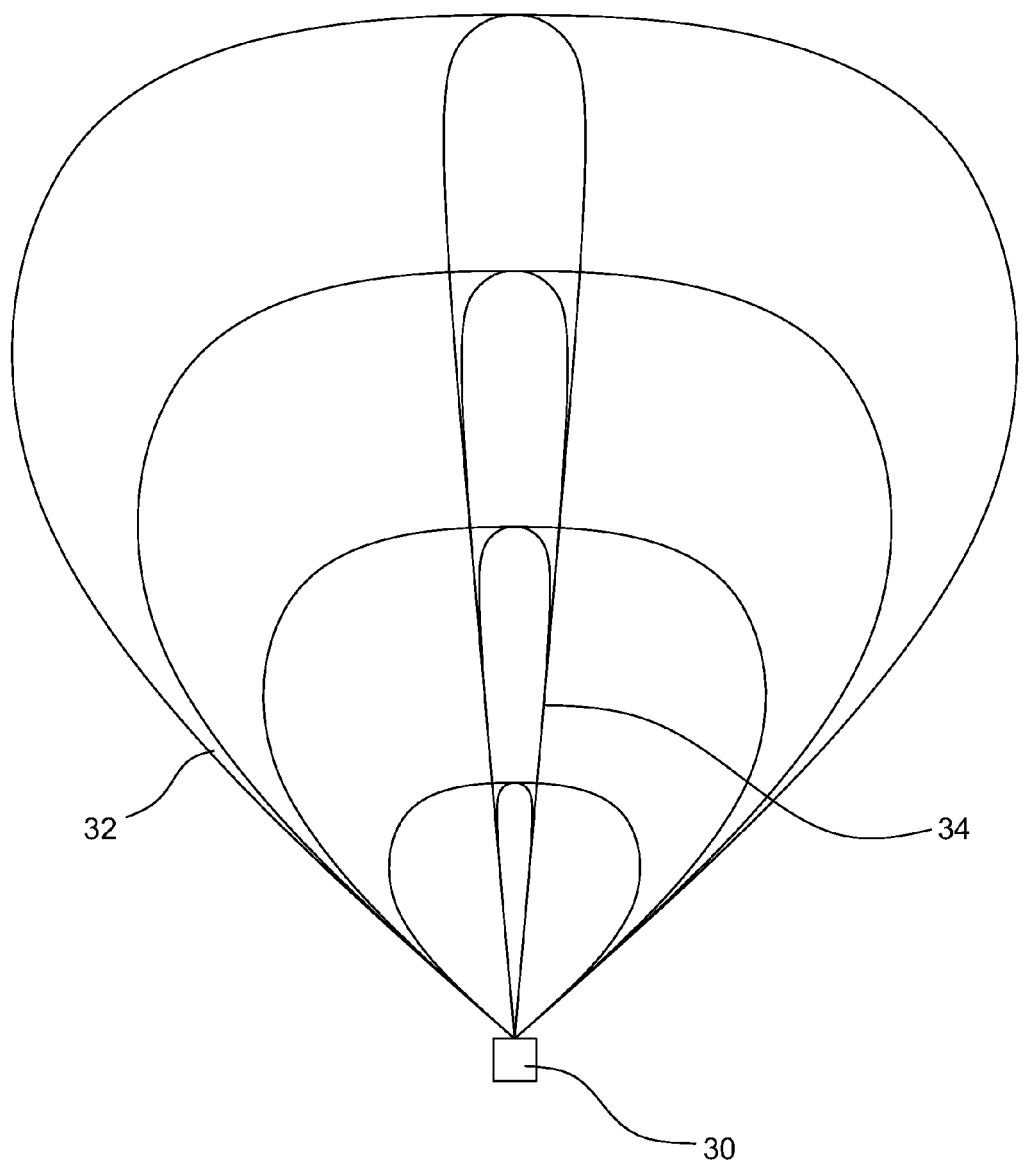
FIG. 3 illustrates schematically direction of unshifted and upshifted acoustic signals in corresponding acoustic beams.

Certain methods disclosed or claimed herein can further comprise emitting portions of the unshifted and upshifted acoustic signals as directional acoustic beams. Each beam can be characterized by a corresponding unshifted or upshifted solid angle in which a substantial portion of its acoustic energy propagates. As noted above, for a given emitter size, the solid angle of an acoustic beam is roughly inversely proportional to the acoustic frequency squared, i.e., an acoustic signal at a higher frequency can be directed into a tighter acoustic beam than an acoustic signal at a lower frequency. Equivalently, the unshifted solid angle is larger than the upshifted solid angle. Applying this principle to acoustic noise management or mitigation, acoustic noise at higher frequencies can be more readily managed by direction or redirection away from sensitive areas than acoustic noise at lower frequencies. Frequency upshifting can therefore be employed to exploit that behavior. Both unshifted and upshifted portions of the acoustic noise signal can be directed or redirected by an acoustic director (e.g., an aperture, surface, plate, or other structure arranged to emit acoustic signals), but the upshifted portion can be confined to a tighter acoustic beam and therefore more readily directed away from a selected region where it is desired to reduce acoustic noise (FIG. 3, which schematically illustrates an unshifted acoustic beam 32 and an upshifted acoustic beam 34 emanating from an acoustic director 30). By upshifting at least a portion of the acoustic noise signal, overall incident intensity of acoustic noise into the selected region can be reduced, without necessarily decreasing the total acoustic noise energy emitted by the acoustic source and frequency converter.

Figure 4:
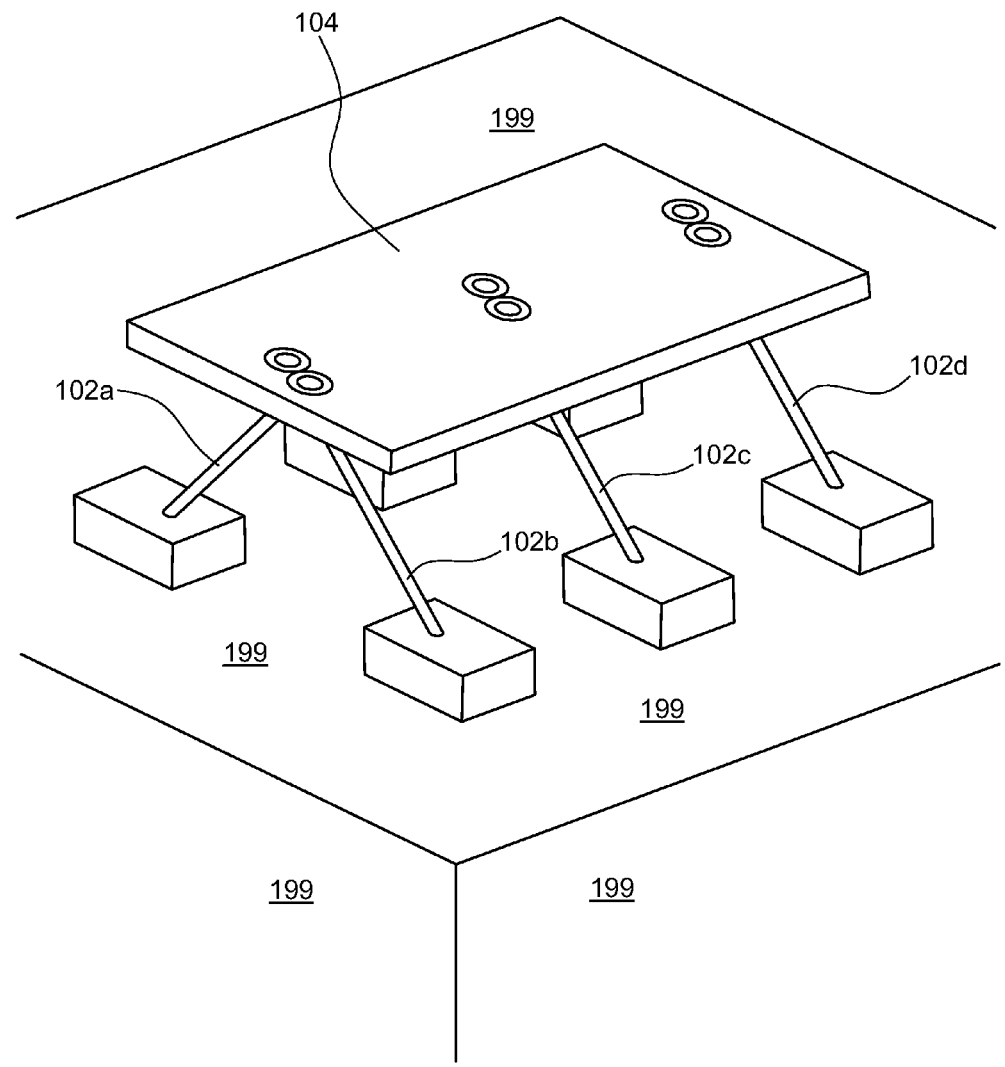
FIG. 4 illustrates schematically an acoustic source and an exemplary frequency converter that produces upshifted acoustic signals.

In certain methods disclosed or claimed herein, a frequency converter comprises two or more resonant members 102a/102b/etc (referred to nonspecifically as member 102x, or collectively as members 102) connected to an acoustic source 199, and a coupling member 104 connecting the resonant members together (FIG. 4; that example shown has six struts 102, two of which are hidden from view). Each resonant member 102x, e.g., a rod, bar, strut, bracket, or other suitable member, exhibits at least one corresponding acoustic resonance frequency in the unshifted frequency range, i.e., within the spectrum of the unshifted acoustic noise signal, and is connected to the acoustic source 199 so that the unshifted acoustic signal drives each resonant member 102x at its acoustic resonance frequency. The coupling member 104, e.g., a plate, bar, or other suitable member, exhibits a nonlinear acoustic response function so as to generate sum-frequency acoustic signals from the resonant frequencies of the driven resonant members 102 and emit those sum-frequency acoustic signals. Those sum frequency acoustic signals are in the upshifted frequency range, and the upshifted acoustic signal includes the sum-frequency acoustic signals. Note that different resonant members can have the same resonance frequency or differing resonance frequencies. Note also that frequency doubling of a single resonant member's frequency is a special case of more general sum frequency generation.

In an exemplary embodiment, a pair of metal struts can act as the resonant members 102 and are each connected to a metal-structured noise source 199. The struts are connected to each other by a metal plate acting as the coupling member 104. Each strut can exhibit a resonance frequency in a range that overlaps the unshifted acoustic noise spectrum of the acoustic source, so that the unshifted acoustic noise signal drives the resonant members at their respective resonance frequencies. In this and subsequent examples, a resonant member driven at its resonance frequency can vibrate at that frequency and may also vibrate at one or more overtone frequencies; a member described as vibrating at its resonance frequency shall be understood also possibly to be vibrating at one or more overtone or harmonic frequencies of that resonance frequency, unless it is specifically recited otherwise (e.g., "vibrating at only its resonance frequency" or similar language). The present disclosure shall be construed as disclosing embodiments wherein a resonant member vibrates at only its resonance frequency as well as embodiments wherein a resonant member vibrates at its resonance frequency and overtones or harmonics thereof. In some instances it may be desirable to employ a resonant member that vibrates at only its resonant frequency.

In a specific example, struts 102 may exhibit resonance frequencies of 2000 and 2010 Hz; other suitable resonance frequencies can be selected. A nonlinear acoustic response of the metal plate coupling member can produce one or more sum frequency acoustic signals at 2000 Hz+2010 Hz=4010 Hz, 2×2000 Hz=4000 Hz, or 2×2010 Hz=4020 Hz). The upshifted acoustic signal is emitted by the metal plate 104 into the ambient acoustic environment, e.g., the surrounding atmosphere, and propagates into the surroundings. As seen from the tables in FIGS. 1 and 2A-2C, relative to the unshifted acoustic signals at or near 2000 Hz, the upshifted acoustic signal at or near 4000 Hz undergo (i) about an additional 14 dB/km of acoustic atmospheric absorption, (ii) about an additional 5 dB of attenuation by foam earplugs (depending on the model), (iii) about an additional 5 dB of attenuation by passive earmuffs, and (iv) about an additional 5 or 12 dB of attenuation by a sheet of soundproofing material (unmounted versus mounted on a 16 ga. steel panel). Cumulative effects of the acoustic noise signal are therefore diminished by upshifting at least a portion of the noise signal, relative to those effects in the absence of upshifting.

Frequency converters of the general type or the example of FIG. 4 are not necessarily restricted to producing only pairwise sum frequencies among resonant members. Depending on the non-linear acoustic response exhibited, higher-order sum frequencies can be produced, e.g., sums of three members, twice one member plus another member, sums of overtones (if present), and so forth.

An extensive array (virtually unlimited) of differing sizes, shapes, or materials can be employed for making the resonant members 102, in order to exhibit the desired resonance frequencies. Those desired frequencies are determined by the acoustic spectrum of the noise signal to be managed or mitigated. A certain amount of experimental "tuning" might be required to achieve the desired resonance frequencies in an assembled frequency converter connected to the acoustic source. Struts having various lengths, widths, or cross sections (e.g., circular, elliptical, oval, ovoid, polygonal) can be employed; struts can be employed that have cross sections that are constant or that vary along the length of the strut. The resonant members need not be struts, but can assume any suitable form or arrangement, e.g., bars, rods, plates, brackets, wires, strands, and so forth. The resonant members can have various axial or transverse holes (through or blind) or voids of various number, size, shape, or location to vary the resonant frequency. A resonant member can be hollow or solid, and can comprise one material or multiple materials arranged in any suitable fashion (e.g., concentric layers); regions of differing materials can exhibit distinct interfaces or continuous transitions. Various materials can be employed; stiffer materials have higher sound velocity and therefore higher resonance frequencies for a given size and shape. Suitable materials can include but are not limited to steel, aluminum or its alloys, titanium or its alloys, other metals or alloys, Pyrex® or other glass, quartz or fused silica, glass fibers, beryllium fiber, boron fiber, Kevlar® or other aramid fibers, polyethylene or other polymer fibers, carbon fiber, or buckeytube fiber. The resonant members can all be substantially identical, or can differ substantially from one another. Similar arrays of sizes, shapes, or materials can be employed for the examples described below.

In a variation of the embodiment of FIG. 4, the coupling member 104 can include or act as an acoustic emitter that emits the upshifted acoustic signal. In one example, a single member, e.g., a flat metal plate, can act as both coupling member and acoustic emitter. In other examples, the acoustic emitter can comprise a discrete member or assembly that is connected to the coupling member 104. Any type of directional acoustic emitter can be employed and can be coupled to the coupling member 104 in any suitable way. Similarly, any of the examples described below can include an acoustic director or not, as desired.

Figure 5:
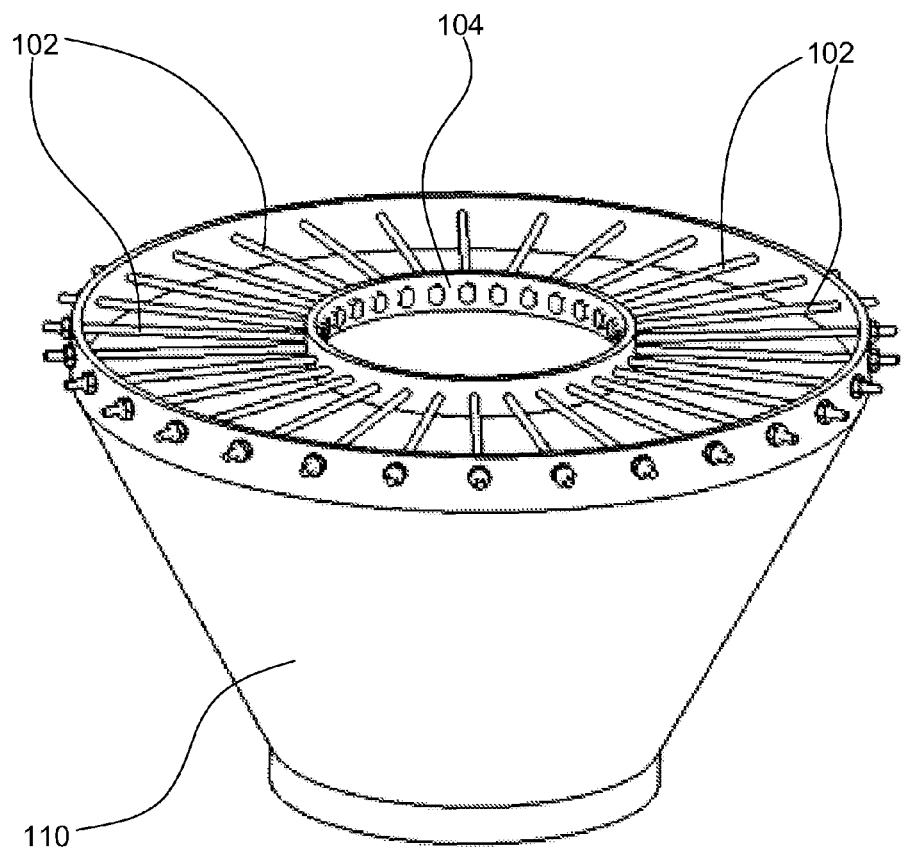
FIG. 5 illustrates schematically another exemplary frequency converter that produces upshifted acoustic signals.

Another variation of the embodiment of FIG. 4 is illustrated schematically in FIG. 5. A set of multiple resonant members 102 (radial rods in this example) connect a frusto-conical bracket 110 to a coupling member 104 (a ring in this example). The bracket 110 is attached to the acoustic source (not shown) and acts as a first structural member. A second structural member (not shown) is connected to the coupling member 104. The frequency converter (i.e., bracket 110, rods 102, and ring 104) act as a mechanical linkage between the first and second structural members. Any acoustic noise signal propagating along the structural members drives resonant vibrations of the rods 102, and a nonlinear acoustic response mediated by the ring 104 produces sum-frequency acoustic signals that are emitted by the rods or by the second structural member as the upshifted acoustic signal.

Figure 6:
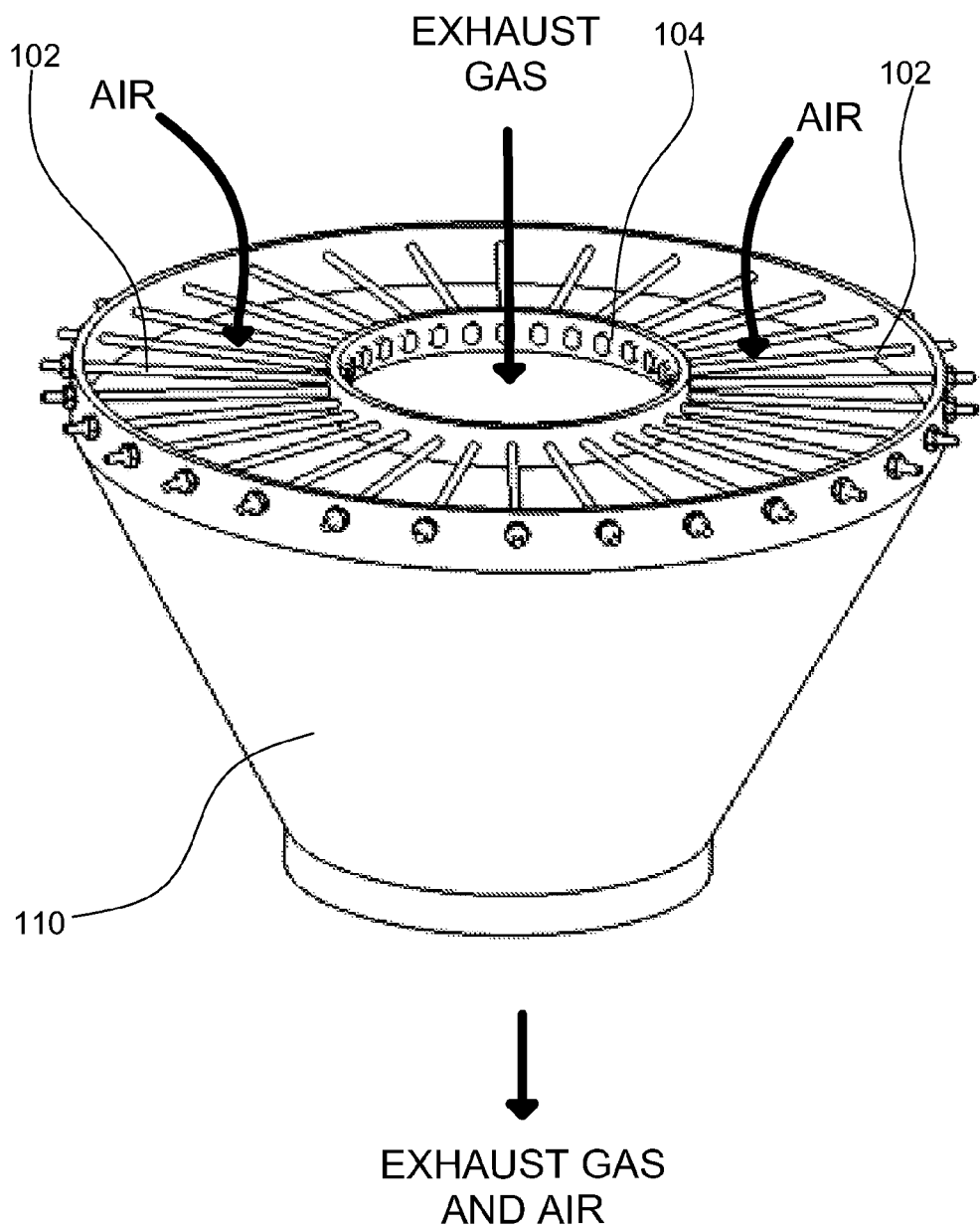
FIG. 6 illustrates schematically another exemplary frequency converter that produces upshifted acoustic signals.

In certain methods disclosed or claimed herein, a frequency converter comprises two or more resonant members 102a/102b connected to the acoustic source and a coupling member 104 connecting the resonant members together, similar to the examples of FIGS. 4 and 5. Also similar to the examples of FIGS. 4 and 5, each resonant member 102x exhibits at least one corresponding acoustic resonance frequency. Unlike the examples of FIGS. 4 and 5, however, the resonant frequencies of the members 102 are in the second, upshifted frequency range. Each resonant member 102 is connected to the acoustic source so that the acoustic source causes gas to flow past the resonant members 102 (FIG. 6; acoustic source not shown) and to drive each one of them at its corresponding acoustic resonance frequency (much as wind can cause harp strings to vibrate, for example). The resonant members 102 thus driven emit the upshifted acoustic signal at their resonance frequencies, possibly including overtones or harmonics, which is upshifted relative to unshifted acoustic noise carried by the flowing gas. Instead of the rods 102 being resonant within the unshifted noise spectrum (similar to FIGS. 4 and 5 and described earlier), in the example of FIG. 6 the rods 102 are resonant at one or more desired upshifted frequencies. In a specific exemplary implementation, an exhaust passage (not shown) from a combustion engine (acting as the noise source) can be inserted into the ring 104, and exhaust gas can flow through the ring 104 and through the frusto-conical bracket 110 (presumably into another exhaust passage (not shown). Surrounding air is drawn into the exhaust passage past the rods 102 (e.g., by a Venturi effect), driving them at their resonance frequencies (and possibly overtones or harmonics) and causing them to emit the upshifted acoustic noise signal. This specific example serves a dual purpose. The surrounding air drawn into the exhaust stream can also cool the exhaust gases, which can be beneficial for a variety of reasons unrelated to noise management, including suppressing the heat signature of a military aircraft. The flow of that surrounding air past the rods 102, and the resulting emission of the upshifted acoustic noise signal, reduces the impact of acoustic noise arising from the exhaust stream, as variously described above. When implemented on jet engines of aircraft, for example, upshifting using the frequency converter of FIG. 6 can result in significant mitigation of engine noise, through one or more of the mechanisms described above. In another, related example of this arrangement, the exhaust gases of a combustion engine can be directed to flow past the resonant member 102, instead of or in addition to flow of surrounding air.

In another example disclosed or claimed herein, the frequency converter comprises a plurality of resonant members 202a/202b (nonspecifically member 202x, collectively members 102) connected to the acoustic source not shown). Each resonant member 202x exhibits at least one corresponding acoustic resonance frequency in the upshifted frequency range. All the member 202 can exhibit nearly the same resonant frequency, or the resonant member can exhibit a range of resonant frequencies in the desired upshifted frequency range. Each resonant member 202 is connected to the acoustic source so that the unshifted acoustic signal causes them to undergo multiple collisions that drive them at their respective acoustic resonance frequencies. The upshifted acoustic signal includes acoustic signals emitted by the resonant members 202.

Figure 7:
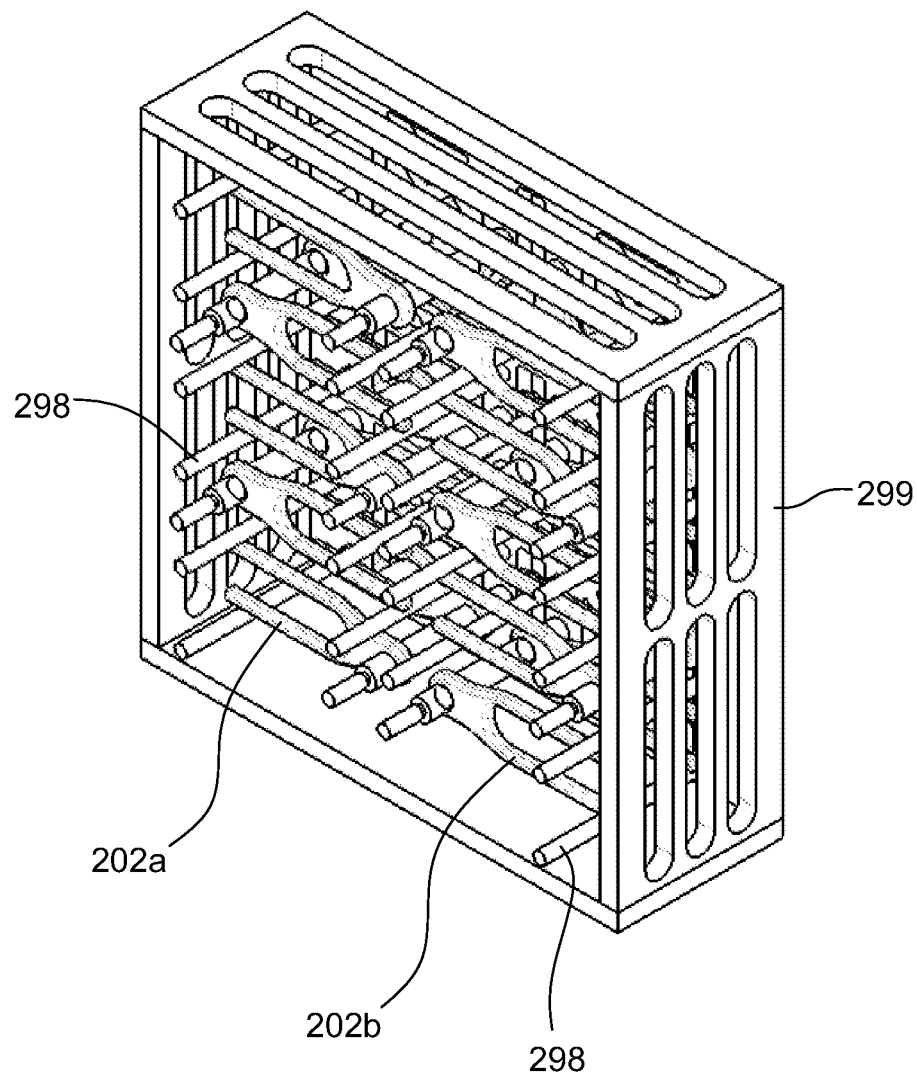
FIG. 7 illustrates schematically another exemplary frequency converter that produces upshifted acoustic signals.

In the specific example shown (FIG. 7), the resonant members are tuning forks 202 pivotably connected at their bases to a housing 299 that is mounted on the acoustic source (not shown). When the housing 299 is shaken by the unshifted acoustic signal (e.g., by vibration of the acoustic source, to which housing 299 is attached), that movement causes the tuning forks 202 to swing about their pivots and collide with the interior of the housing (housing walls or other internal structures such as pins or rods 298 intended for that purpose). Those collisions drive the tuning forks 202 to vibrate at their resonant frequencies (and possibly overtones or harmonics) and to emit the upshifted acoustic signal. Energy in the unshifted acoustic noise signal is therefore converted into energy in the upshifted acoustic noise signal, as desired. Other types of resonant members can be employed (e.g., elongated rods or other shapes), and the resonant members need not be connected to the housing, provided they are at least contained within it. In the tuning fork example, the housing 299 can be fully enclosed, or preferably can comprise a relatively open framework. In a different example, a collection of loose resonant members can be contained within a closed housing. Collisions between the resonant members and the inner walls of the housing drive the resonant members to emit the upshifted acoustic signal.

Figure 8:
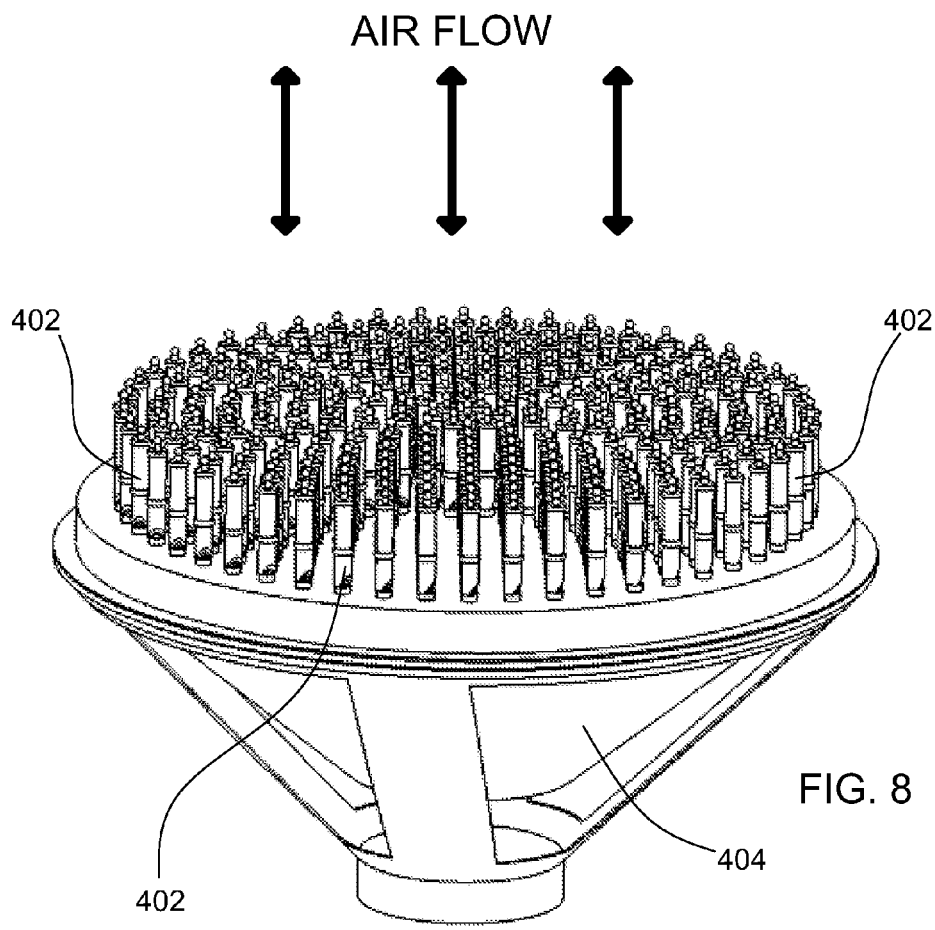
FIG. 8 illustrates schematically another exemplary frequency converter that produces upshifted acoustic signals.
Figure 9:
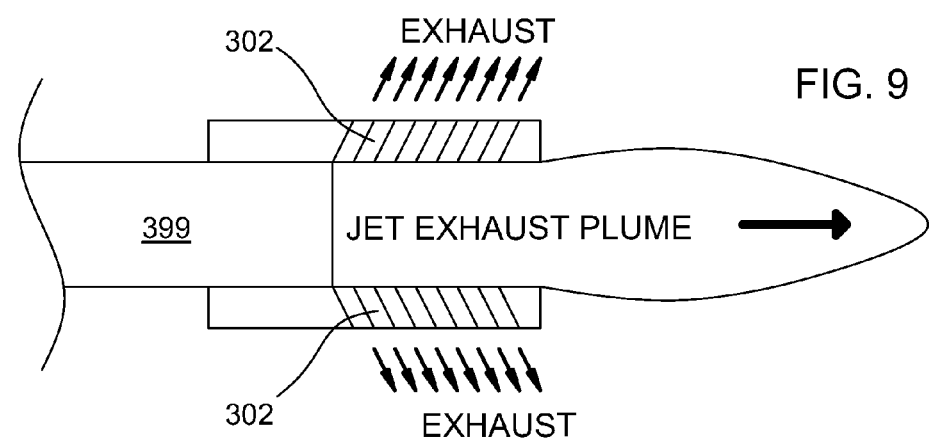
FIG. 9 illustrates schematically another exemplary frequency converter that produces upshifted acoustic signals.

In certain methods disclosed or claimed herein, the frequency converter comprises a plurality of aerophones connected to the acoustic source (FIGS. 8 and 9). Each aerophone (e.g., whistle, flute-like structure, or other structure that emits sound when air passes through it) emits an acoustic signal in the upshifted frequency range when gas flows through it. The aerophones are connected to the acoustic source so that the acoustic source causes gas to flow through the aerophones. The upshifted acoustic signal includes acoustic signals emitted by the aerophones.

In one specific example (FIG. 9), the acoustic source comprises a combustion engine 399 (a jet engine in this example). The combustion engine 399 is arranged so that at least a portion of its gaseous exhaust flows through the aerophones 302 (flute-like tubes in this example). The exhaust gas thus directed causes the aerophones 302 to emit the upshifted acoustic signal. A portion of the unshifted acoustic noise signal emitted by the engine is thus converted to an upshifted acoustic signal, providing all of the noise mitigation and management benefits described above. The aerophones can be selected to all emit at nearly the same frequency, or aerophones can be selected over a range of frequencies within the desired upshifted frequency range.

In a different specific example (FIG. 8), the frequency converter further comprises an air chamber 404 that is arranged so that air flows into and out of the chamber only through the aerophones 402. The air chamber 404 is connected to the acoustic source (not shown) so that the unshifted acoustic signal causes air to flow into and out of the air chamber 404 through the aerophones 402. The air chamber 404 typically exhibits a certain degree of deformability so that when the acoustic source vibrates at the unshifted frequency, the resultant shaking of the air chamber causes it to deform and change its volume. Those volume changes in turn draw air into or force air out of the air chamber through the aerophones 402 (whistles in this example). As above, the aerophones can be selected to all emit at nearly the same frequency, or aerophones can be selected over a range of frequencies within the desired upshifted frequency range. Optionally, the volume, shape, and elasticity or plasticity of the air chamber can be manipulated so that its volume changes exhibit resonant behavior, most advantageously at one or more frequencies in the unshifted acoustic frequency range. Such resonant behavior of the air chamber 404 can enhance the efficiency of upshifting of acoustic energy by the frequency converter.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

In the foregoing Detailed Description, various features may be grouped together in several exemplary embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as disclosing at least implicitly any embodiment having any suitable set of one or more disclosed or claimed features (i.e., sets of features that are not incompatible or mutually exclusive) that appear in the present disclosure or the appended claims, including those sets that may not be explicitly disclosed herein. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC §112 ¶ 6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶ 6 are not intended to be invoked for that claim.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:
1. A method comprising:
using a frequency converter, converting at least a portion of acoustic energy in an unshifted acoustic signal emitted by an acoustic source in a first frequency range into acoustic energy in an upshifted acoustic signal in a second frequency range; and emitting at least a portion of the upshifted acoustic signal into an ambient acoustic environment, wherein:

the second frequency range is higher than the first frequency range, and the unshifted acoustic signal comprises one or more unwanted acoustic noise signals;

the frequency converter comprises two or more resonant members connected to the acoustic source and a coupling member connecting the resonant members together;

each resonant member exhibits at least one corresponding acoustic resonance frequency in the first frequency range;

each resonant member is connected to the acoustic source so that the unshifted acoustic signal drives each resonant member at its acoustic resonance frequency;

the coupling member exhibits a nonlinear acoustic response so as to generate in the second frequency range sum-frequency acoustic signals from the resonant frequencies of the driven resonant members; and the upshifted acoustic signal includes the sum-frequency acoustic signals.

2. The method of claim 1 further comprising emitting portions of the unshifted and upshifted acoustic signals as directional acoustic beams characterized by unshifted and upshifted solid angles, respectively, wherein the unshifted solid angle is larger than the upshifted solid angle.

3. The method of claim 1 wherein the coupling member includes or is coupled to an acoustic emitter that emits the upshifted acoustic signal.

4. The method of claim 1 wherein the coupler is connected to a first structural member, the acoustic source includes a second structural member, and the frequency converter acts as a mechanical linkage between the first and second structural members.

5. An apparatus comprising a frequency converter arranged to be coupled to an acoustic source to receive at least a portion of an unshifted acoustic signal emitted by the acoustic source in a first frequency range, wherein:

the frequency converter is configured to convert at least a portion of acoustic energy in the unshifted acoustic signal into acoustic energy in an upshifted acoustic signal in a second frequency range;

the frequency converter is arranged to emit at least a portion of the upshifted acoustic signal into an ambient acoustic environment; and the second frequency range is higher than the first frequency range, and the unshifted acoustic signal comprises one or more unwanted acoustic noise signals, wherein:

the frequency converter comprises two or more resonant members arranged to be connected to the acoustic source and a coupling member connecting the resonant members together;

each resonant member exhibits at least one corresponding acoustic resonance frequency in the first frequency range;

each resonant member is arranged so that, with the resonant member connected to the acoustic source, the unshifted acoustic signal drives each resonant member at its acoustic resonance frequency;

the coupling member exhibits a nonlinear acoustic response so as to generate in the second frequency range sum-frequency acoustic signals from the resonant frequencies of the driven resonant members; and the upshifted acoustic signal includes the sum-frequency acoustic signals.

6. The apparatus of claim 5 further comprising the acoustic source, wherein the frequency converter is coupled to the acoustic source.

7. The apparatus of claim 5 further comprising an acoustic director arranged to emit portions of the unshifted and upshifted acoustic signals as directional acoustic beams characterized by unshifted and upshifted solid angles, respectively, wherein the unshifted solid angle is larger than the upshifted solid angle.

8. The method of claim 5 wherein the coupling member includes or is coupled to an acoustic emitter arranged to emit the upshifted acoustic signal.

9. The method of claim 5 wherein the coupler is connected to a structural member, and the frequency converter is arranged to act, with the frequency converter coupled to the acoustic source, as a mechanical linkage between the structural member and a structural member of the acoustic source.

10. A method comprising reducing the effect of an unwanted acoustic noise signal by converting, using the frequency converter apparatus of claim 5, at least a portion of acoustic energy in a first frequency range in an unshifted portion of the acoustic noise signal into acoustic energy in a second frequency range, higher than the first frequency range, in an upshifted portion of the acoustic noise signal.

11. The method of claim 10 wherein the effect of the acoustic noise signal includes reception at a remote reception location, and intensity of the upshifted portion of the acoustic noise signal decreases with propagation distance through a gaseous atmosphere, between the remote reception location and a source of the acoustic noise signal, more rapidly than intensity of the unshifted portion of the acoustic noise signal.

12. The method of claim 10 wherein the effect of the acoustic noise signal includes transmission of the acoustic noise signal through a non-gaseous attenuating medium, and the upshifted portion of the acoustic noise signal is attenuated by the attenuating medium to a greater degree than the unshifted portion of the acoustic noise signal.

13. The method of claim 10 wherein the effect of the acoustic noise includes coupling of acoustic energy into one or more resonances of a human body or mechanical structure, and the upshifted portion of the acoustic noise signal couples acoustic energy into the resonances less efficiently than the unshifted portion of the acoustic noise signal.

* * * * *